CAPACITANCE ATTENUATOR

Filed Jan. 21, 1947 2 Sheets-Sheet 1

INVENTOR.
DAVID F. BOWMAN
BY Harry C. Page
ATTORNEY

July 3, 1951 D. F. BOWMAN 2,558,925

CAPACITANCE ATTENUATOR

Filed Jan. 21, 1947 2 Sheets-Sheet 2

INVENTOR.
DAVID F. BOWMAN
BY Harry C. Page
ATTORNEY

Patented July 3, 1951

2,558,925

UNITED STATES PATENT OFFICE 2,558,925

CAPACITANCE ATTENUATOR

David F. Bowman, Bayside, N. Y., assignor, by mesne assignments, to the United States of America as represented by the Secretary of the Navy Application January 21, 1947, Serial No. 723,287

2 Claims. (Cl. 178—44)

Figure 1:
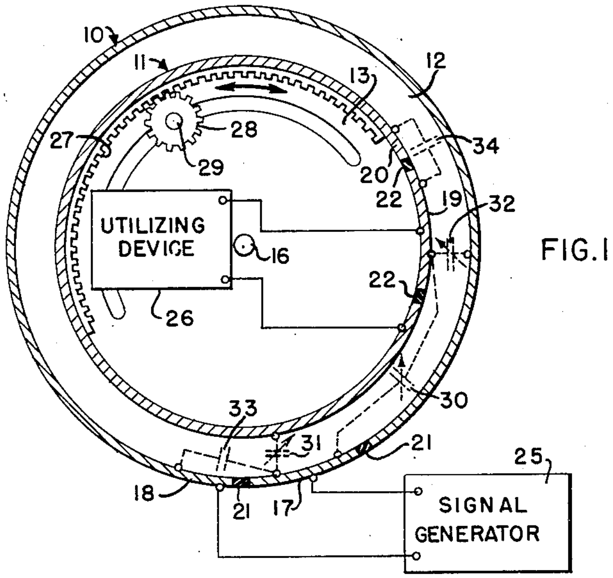

The present invention is directed to capacitance attenuators and, particularly, to high-frequency capacitance attenuators which are adapted to maintain substantially constant input and output capacitances as the mutual capacitance of the attenuator is adjusted over its operating range.

Capacitance attenuators are particularly useful for making electrical measurements or other investigations at frequencies which are so high that other forms of attenuators are either inaccurate or bordering on the impractical. In a typical arrangement of this character for making measurements, the capacitance attenuator is connected between the output terminals of a high-frequency signal generator and the input terminals of an electrical device such as a meter or an antenna system. Observations are made after adjusting the mutual capacitance of the attenuator so that the voltage derived from the signal generator is reduced to a desired value. In some prior attenuators which are utilized in this manner, the adjustment of the mutual capacitance thereof undesirably alters the input capacitance of the attenuator. This variation of the input capacitance often reacts on the tuned circuit of the signal generator so that undesirable changes in the frequency of the generated signal result. Consequently, measurements or observations which are made with prior such arrangements are not always as accurate and hence as reliable as desired.

Other prior capacitance attenuators, while being effective to maintain a fairly constant input capacitance with variations of the mutual capacitance, are subject to changes in the output capacitance thereof. Frequently the input and the output impedance of the attenuator, when the latter is connected in circuit between a source and a load, do not match the characteristic impedance of the load. In either of the two last-mentioned cases, reflections are produced at the load terminals and the application of the reflected energy to the signal generator often reacts in a manner undesirably to change the level of the signal developed by the signal generator. Consequently, the calibration of the attenuator is not as accurate as desired. Additionally, the insertion loss afforded by the attenuator not only includes the loss of energy attributed to the attenuator but also the loss which is introduced by mismatching effects. If the last-mentioned effects vary, then in those installations wherein accuracy is important the calibration of the attenuator is not wholly reliable.

In other capacitance attenuators, the construction is such that the output capacitance is much larger than the maximum mutual capacitance thereof so that the output voltage which is afforded by the attenuator is particularly low. This results since the output voltage of a capacitance attenuator is inversely proportional to the output capacitance thereof. This excessive reduction in voltage may be undesirable for certain applications wherein less attenuation of the output voltage of the signal generator is required.

It is an object of the present invention, therefore, to provide a new and improved capacitance attenuator which avoids one or more of the above-mentioned disadvantages and limitations of prior such attenuators.

It is another object of the invention to provide a new and improved capacitance attenuator which maintains substantially constant input and output capacitances as the mutual capacitance of the attenuator is adjusted over the operating range thereof.

It is an aditional object of the invention to provide a capacitance attenuator which is effective to maintain substantially constant input and output impedances, the aforesaid impedance being either equal or unequal in value.

It is a still further object of the invention to provide a capacitance attenuator which, when connected in circuit, affords an insertion loss which is effectively free from mismatching effects.

In accordance with the invention, a capacitance attenuator comprises a pair of input terminals and a pair of output terminals and a signal-translating path effectively including an adjustable condenser between one of the input terminals and one of the output terminals. The attenuator also comprises another signal-translating path effectively including an adjustable condenser between the aforesaid one of the input terminals and the other of the output terminals. The capacitance attenuator additionally comprises a signal-translating path effectively including an adjustable condenser between the aforesaid one of the output terminals and the other of the input terminals. The attenuator further includes unicontrol means for effectively adjusting the second- and third-mentioned condensers in the same sense, and also means connected with the unicontrol means for effectively and simultaneously adjusting the first-mentioned condenser to such a degree and in an opposite sense to any adjustments of the second- and third-mentioned condensers that the effective input and output capacitances of the attenuator remain substantially constant.

For a better understanding of the present invention, together with other and further objects thereof, reference is had to the following description taken in connection with the accompanying drawings, and its scope will be pointed out in the appended claims.

Figure 2:
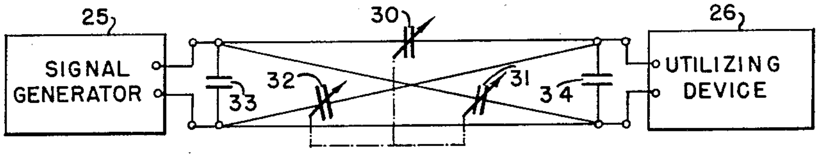
Figure 3:
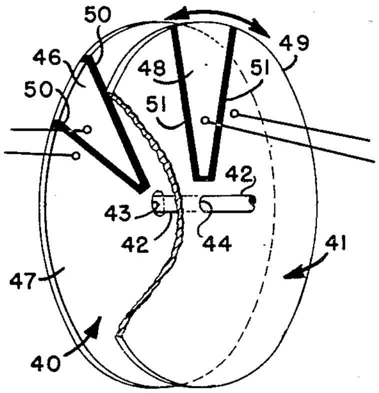
Figure 5:
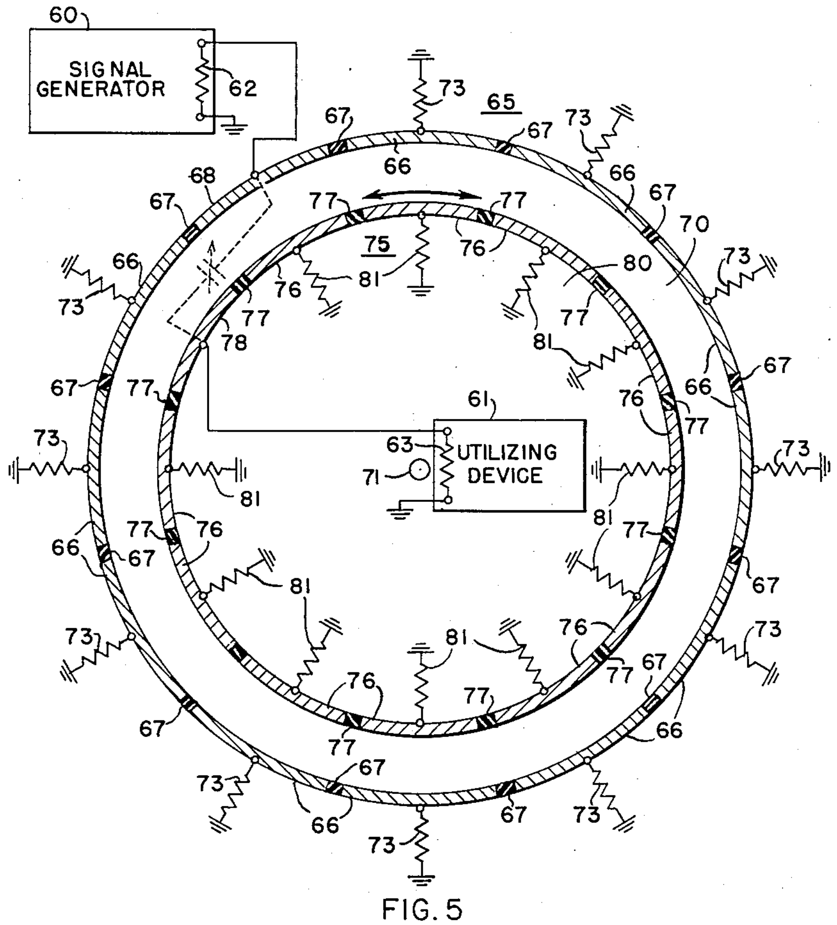
Figure 4:
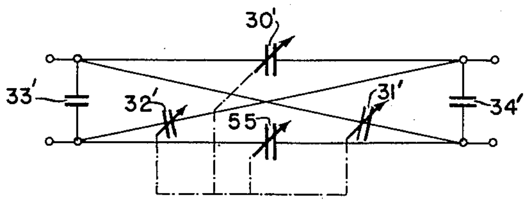

Referring now to the drawings, Fig. 1 is a transverse sectional view of a capacitance attenuator in accordance with the invention; Fig. 2 is an equivalent circuit diagram of the arrangement of Fig. 1; Fig. 3 is a diagrammatic representation of a modified form of the invention; Fig. 4 is an equivalent circuit diagram of the Fig. 3 attenuator; and Fig. 5 is a diagrammatic illustration of an additional modification of the invention.

Referring now more particularly to Fig. 1 of the drawings, there is illustrated a capacitance attenuator in accordance with the invention which comprises two arcuate members, specifically coaxial cylindrical electrode structures 10 and 11. Each end of the cylindrical electrode structure 10 includes an end plate 12 which may be constructed of conductive or insulating material, preferably the first-mentioned type of material, while the corresponding ends of the electrode structure 11 include similar end plates 13, 13. The inner electrode structure 11 preferably has an axial length which is less than that of the outer electrode structure 10 so that the former is effectively shielded by and confined within the outer structure. The capacitance attenuator also includes means for supporting the structures 10 and 11 for relative movement and with effectively a uniform separation therebetween for all relative positions thereof. This means comprises a shaft 16 which passes through the central portions of the end plates 12, 12 and 13, 13. The shaft 16 is adapted freely to rotate within the central portion of the end plate 12 of structure 10 and the corresponding portion of the end plate 13 of the structure 11. The structure 10 is secured against rotation by suitable means (not shown) so that relative rotation of the electrode structures 10 and 11 is afforded when structure 11 is driven.

The electrode structure 10 includes two portions 17 and 18 which may comprise or to which may be affixed input terminals while the member 11 includes two portions 19 and 20 which may comprise or to which may be affixed output terminals. Each of members 17, 18, 19, and 20 is of electrically conductive material. The conductive portions 17 and 19 preferably extend parallel to the axis of the shaft 16 for a distance equal to a portion of the length of their adjacent portions 18 and 20, respectively, and are insulated therefrom at their peripheral portions by means of insulating spacers 21 and 22. The sizes of the conductive portions 17 and 19 in relation to the sizes of the conductive portions 18 and 20 are determined largely by the attenuation to be afforded by the device. The separation between the electrode structures 10 and 11 is preferably small, although this spacing is also determined by the attenuation which is to be provided by the device.

In accordance with a representative use for the attenuator, the input terminals of portions 17 and 18 are connected to a conventional signal generator 25 while the output terminals of portions 19 and 20 are connected to a suitable utilizing device 26 which may comprise a meter, the accuracy of which may require investigation. The attenuator includes a signal-translating path effectively including an adjustable condenser between one of the input terminals, specifically the terminal 17, and one of the output terminals, namely the terminal 19. This condenser or capacitance is illustrated by a condenser 30 which is shown in broken-line construction. Another signal-translating path effectively includes an adjustable condenser between the aforesaid one of the input terminals, namely the input terminal 17, and the other output terminal 20. The last-mentioned condenser is represented by the condenser 31 which is illustrated by the broken-line construction. An additional signal-translating path effectively includes an adjustable condenser between one of the output terminals, specifically the terminal 19, and the other input terminal 18. This condenser or capacitance is represented by a broken-line condenser 32. By a proper dimensioning of the portions 17 and 19, the capacitances represented by the condensers 31 and 32, in addition to the effective input and output capacitances of the attenuator, may be made substantially equal. This relation is achieved when the portions 17 and 19 have the same axial length and subtend equal angles of their respective structures 10 and 11. The portions 17 and 18, due to their fixed spacing and fixed areas have a substantially constant capacitance therebetween. For similar reasons, the output terminals 19 and 20 have a substantially constant capacitance therebetween. These capacitances are represented, respectively, by the broken-line condensers 33 and 34.

The capacitance attenuator also includes means for producing the above-mentioned relative movement of the electrode structures 10 and 11 for adjusting the second- and third-mentioned condensers 31 and 32 in the same sense and for simultaneously adjusting the first-mentioned condenser 30 to such a degree in an opposite sense to any adjustment of the condensers 31 and 32 that the effective input and output capacitances of the attenuator remain substantially constant. This means comprises an arcuate rack 27 which is attached to the inner wall of the cylindrical structure 11 near one end thereof and a pinion 28 which is secured to a rotary shaft 29 which passes freely through a suitable aperture in one of the end plates 12 of the cylindrical structure 10. A suitable scale (not shown) is employed in conjunction with the shaft 29 to indicate the position of the inner cylindrical structure 11 with respect to the fixed outer cylindrical structure 10.

Considering now the operation of the above-described attenuator, it will be assumed that a known voltage which is developed by the signal generator 25 is to be reduced in steps by predetermined amounts as established by the individual settings of the attenuator for application to the device 26 to check the accuracy of the reading thereof. To adjust the attenuator to its initial position, the shaft 29 is rotated a predetermined amount as indicated by the scale associated therewith thereby actuating the rack and pinion arrangement 27, 28. This operation is effective to rotate the cylindrical structure 11 about the shaft 16 with relation to the stationary cylindrical structure 10. Displacement of the structure 11 counterclockwise with respect to the structure 10, for example, is effective to increase the separation between conductive portions 17 and 19, thus decreasing the capacitance 30. Capacitances 31 and 32, however, increase due to the effective areas of the pair of conductive portions 17, 20 and 19, 18 coming into closer relationships. Consequently, the capacitances 31 and 32 vary simultaneously in one sense while the capacitance 30 varies in an opposite sense to any variation of the capacitances 31 and 32. The capacitances 33 and 34 remain equal during this adjustment. The aforesaid variation of the capacitance 30 does not alter the total capacitance between the electrode structures 10 and 11. Consequently, the effective input and output capacitances, each of which is the resultant of the capacitances identified above by reference numerals, remain substantially constant despite any changes in the value of the capacitance 30. At the proper setting of the attenuator, the scale reading of the device 26 is checked to determine its accuracy. The described checking operation is then performed at other positions of adjustment of the attenuator to determine the accuracy of the device 26 over its operating range.

It will be seen, therefore, that the rack and pinion arrangement 27, 28 comprises a unicontrol means for effectively adjusting the capacitances 31 and 32 in the same sense. Also, the shape and the arrangement of the electrode structures 10 and 11 are such that they comprise means connected with the unicontrol means for effectively and simultaneously adjusting the capacitance 30 in an opposite sense to any adjustments of the capacitances 31 and 32 so that the effective input and output capacitances of the attenuator remain substantially constant.

To aid in understanding the operation of the arrangement of Fig. 1 more fully, reference is made to Fig. 2 of the drawings wherein there is illustrated schematically the arrangement of Fig. 1, corresponding units and capacitances being designated by the same reference characters. It will be seen that the condenser 30 represents the adjustable mutual capacitance of the attenuator and that the control of this condenser is connected to that of the unicontrolled adjustable condensers 31 and 32. As previously stated, the adjustment of the condenser 30 is of such magnitude and sense with respect to the adjustment of the condensers 31 and 32 that substantially constant effective input and output capacitances result for any variation of the mutual capacitance 30 over its effective operating range.

Referring now to Fig. 3 of the drawings, there is represented diagrammatically the principal elements of a modified form of an attenuator in accordance with the present invention. A pair of electrically conductive circular discs 40 and 41, preferably having equal diameters, are mounted in parallel coaxial relationship on a shaft 42 which is constructed of insulating material. The shaft 42 is adapted to rotate freely in a bore 43 in the disc 40, the latter being secured against rotation in any conventional manner (not shown). The shaft 42 is secured within a bore 44 in the disc 41 by means of a press fit so that rotation of the shaft provides relative movement between the discs 40 and 41. The disc 40 includes two portions which may comprise or to which may be affixed a pair of input terminals 46 and 47 while the movable disc 41 includes two portions which may comprise or to which may be attached a pair of output terminals 48 and 49. Corresponding elements of the two discs preferably have equal areas. The portions to which terminals 46 and 48 are connected are preferably, although not necessarily, triangular-shaped segments which are insulated from the electrodes 47 and 49 by insulating spacers 50 and 51.

The operation of the Fig. 3 arrangement is essentially the same as that of the Fig. 1 embodiment of the invention. Relative movement of the discs 40 and 41 procured by rotating the shaft 42 varies the mutual capacitance, for example the capacitance between the terminals 46 and 48 in one sense while the capacitance between the terminals 46 and 49 and the corresponding capacitance between the terminal 48 and the terminal 47 is varied in the opposite sense. Since the areas of corresponding portions of the two discs are equal, the two last-mentioned capacitances also vary equally and the effective input and output capacitances of the attenuator remain substantially constant.

Reference is now made to the schematic diagram of Fig. 4 for a more detailed description of the operation of the Fig. 3 arrangement. It will be observed that this circuit diagram corresponds in all respects but one, which will be referred to subsequently, with those of the attenuator represented schematically in Fig. 2. Accordingly, elements in the Fig. 4 arrangement corresponding to those of the Fig. 2 circuit are designated with the same reference numerals primed. It will be noted that an additional adjustable capacitance represented by the condenser 55 appears between an input terminal and an output terminal corresponding to the terminals 47 and 49, respectively, in the Fig. 3 arrangement. This capacitance is due to the separation between the discs 40 and 41 which is maintained by the insulating shaft 42. It is to be understood, however, that a conductive shaft may, if desired, be employed as in the Fig. 1 arrangement wherein the capacitance corresponding to the condenser 55 is absent. The capacitances 55 and 30′ vary in the same sense as the disc 41 is rotated relative to the stationary disc 40.

While the previously described attenuator arrangements embodying the present invention exhibit substantially constant input and output capacitances and input and output impedances which are sufficiently constant for most attenuator applications, the input and output impedances vary slightly as the mutual capacitance of the attenuator is adjusted. This variation is ordinarily small, however, since the load impedance which is coupled to the output circuit of the attenuator is usually large in comparison with the mutual capacitance afforded by the attenuator. This variation may prove to be excessive for certain purposes wherein greater accuracy is desired. For applications of the last-mentioned type, for example the use of an attenuator to simulate the characteristics of an adjustable length of transmission line which presents a constant impedance, an attenuator of the type illustrated in Fig. 5 of the drawings has particular utility. The capacitance attenuator there represented is adapted for use in circuit between a first impedance which may comprise a signal generator 60 and a second impedance in the form of a utilizing device 61. The signal generator 60 has a characteristic impedance represented by a resistor 62 while the impedance of the utilizing device 61 is represented by a resistor 63.

The attenuator comprises a first cylindrical electrode structure 65 which includes a plurality of portions 66, 66 and a portion 68 which are equal in area and spaced uniformly around the periphery of the structure 65 by means of insulating spacers 67, 67 which completely enclose the portions. The first structure 65 is generally similar to the member 10 of the Fig. 1 arrangement and includes an end plate 70 of conductive material attached at either end thereof. The end plates are centrally mounted on a rotary shaft 71 but are secured against rotation therewith by suitable means (not shown). The attenuator also includes a pair of input terminals and a pair of output terminals. One of the portions of the electrode structure 65, namely portion 68, may comprise or have attached thereto a first input terminal which is connected directly to the high-potential terminal of the signal generator 60. The other input terminal is an equipotential surface or grounded terminal. This other terminal may comprise grounded end plates 70, 70 which are at the same potential as the low-potential terminal of the signal generator 60, and this grounded terminal is illustrated schematically to simplify the representation. A plurality of resistors 73, 73, each of which has an impedance value equal to that of the resistor 62 of the signal generator 60, are coupled between individual ones of the portions 66 of the first structure 65 and the other or grounded input terminal.

The capacitance attenuator also includes a second cylindrical electrode structure 75 which comprises a plurality of portions 76, 76 and a portion 78 which are equal in area and uniformly spaced about the periphery of the structure 75 by means of insulating spacers 77, 77 which surround each of the foregoing portions. The second structure 75 corresponds to the member 11 of the Fig. 1 embodiment and has an end plate 80 of conductive material at either end thereof. The end plates 80, 80 are centrally positioned on the rotary shaft 71 and are rotatable therewith so as to provide relative movement between the stationary structure 65 and the other structure 75. The portion 78 forms or is attached to a first output terminal which is connected directly to the high-potential terminal of the utilizing device 61. The other output terminal is at ground potential and may comprise the end plates 80, 80 of the structure 75. A plurality of resistors 81, 81, each of which has an impedance equal to that of the resistor 63 of the utilizing device 61, are coupled between individual ones of the portions 76, 76 and the grounded output terminal. This grounded connection is also illustrated schematically for the purpose of simplifying the illustration.

The attenuator, therefore, comprises a first signal-translating path which effectively includes only an adjustable condenser between one of the input terminals and one of the output terminals, specifically terminals 68 and 78, respectively. The arrangement also comprises a second signal-translating path including a parallel combination of condensers which combination, however, effectively comprises an adjustable condenser between the input terminal 68 and the portions 76, 76, each of which is connected to the grounded output terminal through one of the plurality of resistors 81, 81 as mentioned above. It will be apparent that the attenuator also comprises a third signal-translating path which effectively includes an adjustable condenser between the output terminal 78 and the portions 66, 66, each of the latter being connected to the grounded input terminal through one of the plurality of resistors 73, 73.

Considering now the operation of the above-described arrangement, the mutual capacitance between the terminals 68 and 78 is adjusted to a desired value by rotating the shaft 71 and the attached structure 75 with respect to the structure 65. The other terminal capacitances of the attenuator vary substantially in the manner previously explained in connection with the arrangement of Fig. 1 so that the effective input and output capacitances remain substantially constant. In view of the correspondence or symmetry of the arrangement of the portions 76, 76 and 78 and their associated resistors 81, 81 and 63 of the second or output structure 75 with relation to the arrangement of the portions 66, 66 and 68 and their associated resistors 73, 73 and 62 of the first or input structure 65, the impedance looking into the attenuator at the input terminals with the load 63 connected is constant and equal to the generator impedance 62 regardless of the relative positions of the two structures and, hence, regardless of the value of the mutual capacitance therebetween. Similarly, the impedance looking into the attenuator at the output terminals, with the generator 60 connected as illustrated, is constant and equal to the load impedance 63. Consequently, the attenuator serves as a constant impedance device at each position of adjustment thereof and the generator 60 delivers a constant power to the combination comprising the attenuator and the utilizing device 61.

From the above description of the several embodiments of the invention, it will be apparent that any of the described attenuators may be proportioned to afford high, intermediate, or low values of attenuation. For example, attenuators with portions having similar areas and wide separations therebetween provide high attenuation and, conversely, large areas and small separations provide low values of attenuation. Also, input and output terminals associated with portions having different areas will afford different input and output capacitances so that a proper dimensioning is necessary to secure equal input and output capacitances. In arrangements constructed in accordance with the Fig. 5 embodiment of the invention, the resistors in the input and the output portions of the attenuator need not necessarily have the same values and, hence, each may have a value which is equal to the impedance of the corresponding input or output device which is coupled to the attenuator.

From the foregoing description of the various forms of the invention, it will be manifest that an attenuator embodying one form of the invention is effective to provide substantially constant effective input and output capacitances with variation of the mutual capacitance thereof while an attenuator in accordance with another form of the invention is effective to afford substantially constant input and output impedances at the attenuator terminals so that changes in the adjustment of the attenuator do not develop mismatching effects which impair the proper functioning of other electrical units associated with the attenuator.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An adjustable capacitance attenuator having equal input and output capacitances for all adjustments thereof comprising, inner and outer cylindrical plate members mounted for adjustment about a mutual longitudinal axis, means rotating one said member with respect to the other said member, longitudinal insulating segments dividing each said member into unequal cylindrical segments, the corresponding segments of the inner and outer members, respectively, subtending the similar solid angles at the axis, means for connecting the plate segments of one said member to an input circuit and the plate segments of the other said member to an output circuit, and adjusting means rotating one plate member relative to the other plate member about said axis, thereby to similarly and simultaneously change the input and output capacitances.

2. A capacitance attenuator for maintaining capacitance matching over a range of coupling capacitances comprising, inner and outer pairs of cylindrical condenser plates concentrically arranged for rotation about a common cylindrical axis, means separating electrically the members of each pair, said members being in capacitative coupling to each other and to the members of the other pair of plates, there being a smaller member of each pair subtending the same solid angle from said axis, input and output circuit connections to the members, respectively, of said pairs of plates, and means rotating one pair of plates for varying the coupling between the larger members of the pairs and the coupling between the smaller members of the pairs, respectively, without changing the ratio of capacitance between the smaller member of a first pair and the larger member of the other pair over capacitance between the smaller member of the other pair and the larger member of the first pair.

DAVID F. BOWMAN.

REFERENCES CITED

The following references are of record in the file of this patent:

UNITED STATES PATENTS

| Number | Name | Date |
|---|---|---|
| 2,000,678 | Van Der Pol et al. | May 7, 1935 |
| 2,014,228 | De Coutouly | Sept. 10, 1935 |
| 2,075,956 | Payne | Apr. 6, 1937 |
| 2,189,284 | Fritz | Feb. 6, 1940 |
| 2,386,651 | Bisson | Oct. 9, 1945 |